(12) United States Patent
Kolluru et al.

(10) Patent No.: US 9,782,834 B2
(45) Date of Patent: Oct. 10, 2017

(54) FIXTURE

(71) Applicant: ROLLS-ROYCE PLC, London (GB)

(72) Inventors: Kiran Kolluru, Nottingham (GB);
Stewart Lowth, Nottingham (GB);
Mark Raffles, Nottingham (GB);
Dragos Axinte, Nottingham (GB)

(73) Assignee: ROLLS-ROYCE plc, London (GB)

( * ) Notice: Subject to any disclaimer, the term of this patent is extended or adjusted under 35 U.S.C. 154(b) by 157 days.

(21) Appl. No.: 14/610,237

(22) Filed: Jan. 30, 2015

(65) Prior Publication Data

US 2015/0224582 A1 Aug. 13, 2015

(30) Foreign Application Priority Data

Feb. 11, 2014 (GB) .................................. 1402290.9

(51) Int. Cl.
*B23Q 3/06* (2006.01)
*B23B 31/40* (2006.01)

(52) U.S. Cl.
CPC ............ *B23B 31/4093* (2013.01); *B23Q 3/06* (2013.01); *B23Q 3/065* (2013.01); *B23B 2231/48* (2013.01)

(58) Field of Classification Search
CPC .... B25B 3/00; B25B 5/00; B25B 5/04; B25B 5/102; B25B 9/04
See application file for complete search history.

(56) References Cited

U.S. PATENT DOCUMENTS

| | | | |
|---|---|---|---|
| 1,890,016 A * | 12/1932 | Smith | D07B 7/16 29/238 |
| 1,910,652 A | 5/1933 | Taylor | |
| 6,484,552 B1 * | 11/2002 | Bernas | B21D 39/048 29/237 |
| 6,651,967 B1 | 11/2003 | Barber | |
| 7,386,926 B2 * | 6/2008 | Bosche | B25B 27/304 254/10.5 |
| 8,904,848 B2 * | 12/2014 | Frenken | B21D 39/048 72/402 |
| 2010/0164187 A1 | 7/2010 | Geng | |
| 2010/0253015 A1 | 10/2010 | Andre | |
| 2011/0308282 A1 | 12/2011 | Chen | |

(Continued)

FOREIGN PATENT DOCUMENTS

| | | |
|---|---|---|
| DE | 3543353 A1 | 6/1987 |
| DE | 90 11 766 U1 | 12/1991 |
| GB | 2 508 926 A | 6/2014 |

(Continued)

OTHER PUBLICATIONS

Wang et al., "Advanced Reconfigurable Modular Fixture Design for Casing Family," The University of Nottingham, Nottingham Innovative Manufacturing Research Centre.

(Continued)

*Primary Examiner* — Lee D Wilson
(74) *Attorney, Agent, or Firm* — Oliff PLC (57) ABSTRACT

A fixture for stiffening a thin-walled component comprises linking elements which support respective biasing parts and pressure parts. The biasing parts are arranged to urge the pressure parts to press on a thin-walled component, and the linking elements are rigidly connected to one another to resist a reaction force exerted on the pressure parts by the thin-walled component.

19 Claims, 6 Drawing Sheets

(56) References Cited

U.S. PATENT DOCUMENTS

2012/0133103 A1    5/2012  Marshall et al.

FOREIGN PATENT DOCUMENTS

| | | |
|---|---|---|
| JP | S45-5359 Y | 3/1970 |
| SU | 531662 A1 | 10/1976 |
| WO | 00/24546 A1 | 5/2000 |
| WO | 2010/094382 A1 | 8/2010 |

OTHER PUBLICATIONS

Jun. 30, 2014 Search Report issued in British Application No. 1402290.9.
Jun. 5, 2015 Search Report issued in European Application No. 15 15 3056.

* cited by examiner

FIXTURE

The present invention relates to a fixture, in particular a fixture for stiffening a thin-walled component.

Thin-walled components, such as casings, form an important class of engineering structures, for example in gas turbine (jet) engines. This type of component typically lacks sufficient structural rigidity to withstand loads (e.g. cutting forces) which are generated in machine operations during manufacture, leading to dynamic instability and vibration of the component. Stiffening the structure and reducing the vibration is important, not only for improving the part surface quality, which has a direct bearing on its fatigue life, but also to increase the life of processing equipment, such as machine tool spindle bearings and cutting tools.

Two types of damping are generally available for thin-walled components: passive and active. Passive damping is widely used in industry and is generally preferred because it is simple to apply and, unlike active damping, does not require instrumentation or complex tuning algorithms.

A known means of passive damping is the use of fixtures comprising inflatable diaphragms to damp machining vibrations in, for example, thin-walled shell or cylindrical components. Some limitations of this means of damping are as follows.

First, the inflatable diaphragms can be applied only to hollow casings (when applied internally), or to generally smooth surfaces which are free of ribs, bosses, or other obstructive features (when applied externally). Hence this fixturing solution is not appropriate for certain thin-walled components, for example a front bearing housing of a gas turbine engine which comprises projecting vanes and plumbing lines.

Second, parts costs are high because there is a need for separate cylinders or arbours, and inflatable diaphragms, for different diameter casings and also for internal/external application.

Third, the cylinders or arbours and inflatable diaphragms tend to hinder machine tool movement; hence significantly different set-ups may be required where multiple machining operations are needed.

Fourth, the inflatable diaphragms are ineffective for non-circular shapes, for example thin-walled prismatic components, because the contact areas, between the rubber diaphragms and the component, reduce to small patches. There can be high levels of vibration in local undamped patches.

Fifth, the cylinders or arbours are heavy, and pumping up the inflatable diaphragms requires a significant amount of time and energy.

According to an aspect, there is provided a fixture for stiffening a thin-walled component, the fixture comprising linking elements which support respective biasing parts and pressure parts, the biasing parts being arranged to urge the pressure parts to press on a thin-walled component, and the linking elements being connected to one another to resist a reaction force exerted on the pressure parts by the thin-walled component.

The biasing parts and pressure parts supported by the connecting links provide a robust fixture which is able to conform to the shape of a thin-walled casing in order to provide stiffness to the casing during manufacturing operations. Furthermore, the number and/or size of the connecting links may be changed to reconfigure the fixture for use with various thin-walled casings of differing geometry.

The linking elements may be connected to one another so as to restrict relative rotational movement between the linking elements. Or, the linking elements may be connected to one another so as to allow relative rotational movement between the linking elements.

The linking elements may each be generally straight and connected together at their ends such as to form a polygon. The polygon may be a regular polygon, for example having a generally triangular, rectangular, pentagonal, hexagonal, heptagonal, octagonal, or circular, shape. Or, the polygon may be an irregular polygon. The capability to arrange the connecting links into a wide variety of shapes means that the fixture can be configured to fit a diverse range of thin-walled components.

Or, the linking elements may be generally arcuate and connected together at their ends such as to form a generally circular shape. This is particularly appropriate for supporting cylindrical thin-walled components.

The linking elements may be adjustable in order to change the size and/or shape of the polygon or circle. This enables simple transfer of the fixture between thin-walled components which are geometrically similar but of different size.

The respective biasing parts and pressure parts may be discrete elements. Or, the respective biasing parts and pressure parts may be of unitary construction.

The pressure parts may be generally curved, for example concavely or convexly curved. Or, the pressure parts may be generally flat.

The pressure parts may comprise resilient elements. Or, the pressure parts may comprise rigid elements.

The biasing parts may comprise torsion elements, for example torsion springs. Or, the biasing parts may comprise leaf springs, flexural metallic sheets, gas springs, or helical compression springs.

The respective biasing parts and pressure parts may be disposed on axles which extend substantially perpendicularly from the linking elements and the pressure parts arranged to rotate about the axles. Two or more pressure parts may be disposed on each axle. Two or more biasing parts may be disposed on each axle.

Each of the axles may extend from a generally mid-region of one of the linking elements. Or, each of the axles may extend from intersecting or connected portions of the linking elements.

According to another aspect, there is provided a combination of a fixture and a thin-walled component, the fixture being secured to the thin-walled component, the fixture comprising linking elements which support respective biasing parts and pressure parts, the biasing parts urging the pressure parts to press on the thin-walled component in order to stiffen the thin-walled component, and the linking elements being rigidly connected to one another to resist a reaction force exerted on the pressure parts by the thin-walled component.

The fixture may be secured to the inside of the thin-walled component. Or, the fixture may be secured to the outside of the thin-walled component. The fixture is highly versatile because it can be used to support the thin-walled component both internally and externally.

The thin-walled component may be a front bearing housing of a gas turbine engine.

Embodiments will now be described, by way of example, with reference to the accompanying figures in which.

Figure 1:
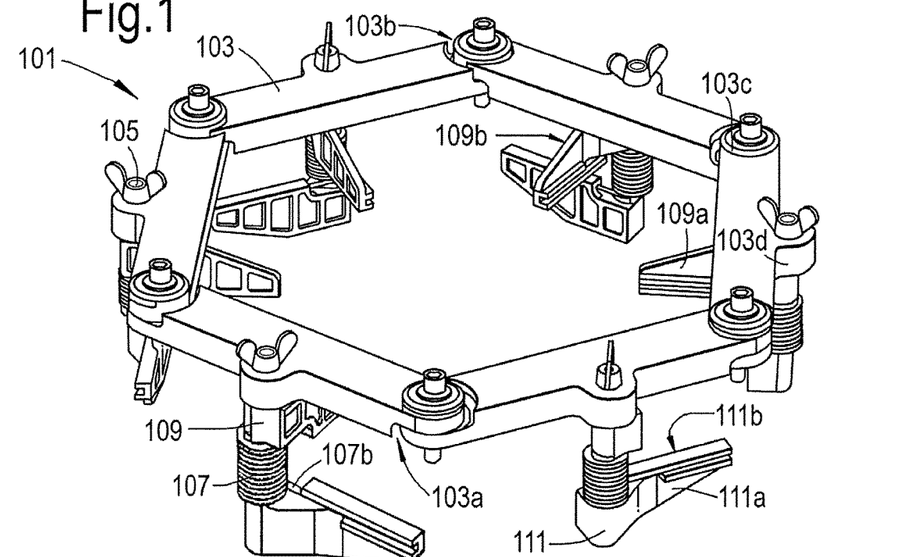
FIG. 1 is a schematic illustration of a fixture.

Referring to FIG. 1, a fixture 101 includes a plurality of links 103. In this embodiment, each link 103 comprises a generally flat, elongate bar having rounded ends. At one end of each link 103, a recess, or undercut, extends about half way through the thickness of the link 103 from its lower surface to provide a lower step portion 103a. At the other end, an undercut extends into the link 103 from its upper surface to provide an upper step portion 103b. Each of the lower step portion 103a and the upper step portion 103b includes a bore hole (not shown) extending there through.

As can be seen in FIG. 1, the links 103 are arranged end-to-end with their respective lower step portions 103a and upper step portions 103b in overlapping relationship, the bore holes of the step portions 103a, 103b being aligned in pairs and removable fasteners (bolts) 103c being received through the bore holes in order to removably connect the links 103 together. In this embodiment, the lower and upper step portions 103a, 103b include splined portions (not shown) which are in locking engagement so as to prevent relative rotational movement between the connected links 103. In this embodiment, the bolts 103c serve only to restrict relative vertical displacement of the connected links (i.e. movement along the axes of the bolts 103c).

In this embodiment, the connected links 103 lie in a substantially flat plane and are particularly rigid in the in-plane direction. In this embodiment, there are six links 103 of equal length which are arranged to form a regular hexagon.

Thus the connected links 103 provide a frame, or support, of the fixture 101.

In this embodiment, each of the links 103 further comprises a support member, or lug 103d, which extends outwardly at the mid-length of the link 103 and includes a bore hole (not shown). Each of the bore holes receives an axle, or mandrel 105, which extends downwardly from the respective link 103 in a direction substantially perpendicular to the plane of the connected links 103. In this embodiment, a proximate end of the mandrel 105 is secured to the lug 103d by a fastener (wing nut).

A biasing element, in this embodiment a spring 107, is disposed at a mid-region of each of the mandrels 105. In this embodiment, the spring 107 is a helical torsion spring. In this embodiment, the spring 107 comprises upper and lower legs 107a (not shown), 107b which form a spring free angle of 270 degrees.

Also disposed on each of the mandrels 105, generally between the spring 107 and the lug 103d, is an upper swing arm 109. The upper swing arm 109 includes a bore hole (not shown) which receives the mandrel 105 such that the upper swing arm 109 is in pivotal relationship about the longitudinal axis of the mandrel 105. In this embodiment, the upper leg 107a of the spring 107 is removably secured to the upper swing arm 109.

In this embodiment, the upper swing arm 109 comprises an upper paddle portion 109a which extends in a direction substantially perpendicular to the longitudinal axis of the mandrel 105 and substantially parallel to the plane of the connected links 103. In this embodiment, the upper paddle portion 109a includes an upper face part 109b. In this embodiment, the upper face part 109b is generally flat. In this embodiment, the upper face part 109b comprises a resilient element.

Further disposed on each of the mandrels 105, generally between the spring 107 and a distal end of the mandrel 105, is a lower swing arm 111. In this embodiment, the lower swing arm 111 is retained on the mandrel 105 by a lock nut (not shown) at the distal end of the mandrel 105. The lower swing arm 111 includes a bore hole (not shown) which receives the mandrel 105 such that the lower swing arm 111 is in pivotal relationship about the longitudinal axis of the mandrel 105. In this embodiment, the lower leg 107b of the spring 107 is removably secured to the lower swing arm 111.

In this embodiment, the lower swing arm 111 comprises a lower paddle portion 111a which extends in a direction substantially perpendicular to the longitudinal axis of the mandrel 105 and substantially parallel to the plane of the connected links 103. In this embodiment, the lower paddle portion 111a includes a lower face part 111b. In this embodiment, the lower face part 111b is generally flat. In this embodiment, the lower face part 111b comprises a resilient element.

In this embodiment, the spring 107, the upper swing arm 109, and the lower swing arm 111 are discrete elements.

In this embodiment, the links 103 are constructed from plastics, in particular ABS plastics. In this embodiment, the spring 107 is constructed from steel wire. In this embodiment, the upper and lower swing arms 109, 111 are constructed from a metallic material, in particular comprising aluminium. In this embodiment, the upper and lower face parts 109b, 111b comprise an elastomeric material, in particular comprising neoprene.

Thus the spring 107 which is disposed on the mandrel 105 comprises a hinge means which is operable to provide rotational movement of the upper and lower swing arms 109, 111 about the mandrel 105. Furthermore, the mandrel 105 supports the spring 107 and, in this embodiment, is sufficiently stiff so as to restrict out of plane movement (bending) of the spring 107.

The installation and operation of the fixture 101 will now be described, with particular reference to FIG. 2. For convenience, the operation will be presented in terms of only one of the six groups of mandrel 105, spring 107, and upper and lower swing arms 109, 111 of the fixture 101 described herein above. However, it will be understood that the principle of operation is the same for all of the six groups of this embodiment.

Initially, the fixture 101 is offered up above a generally circular, thin-walled casing 201, of a type known in the art. In this position, the upper and lower swing arms 109, 111 project outwardly and are approximately 270 degrees apart, with the spring 107 in a relaxed (270 degree) state. Then, the upper and lower swing arms 109, 111 are rotated inwardly, for example by hand, about the longitudinal axis of the mandrel 105 and against the resistance (bias) of the spring 107, in order that the upper and lower swing arms 109, 111 will clear the wall 201a of the thin-walled casing 201 when the fixture 101 is lowered into position in the next step of the installation. In this condition, the upper and lower swing arms 109, 111, and thus the upper and lower legs 107a, 107b of the spring 107, are at least about 180 degrees apart and energy is stored in the deflected spring 107.

Figure 2:
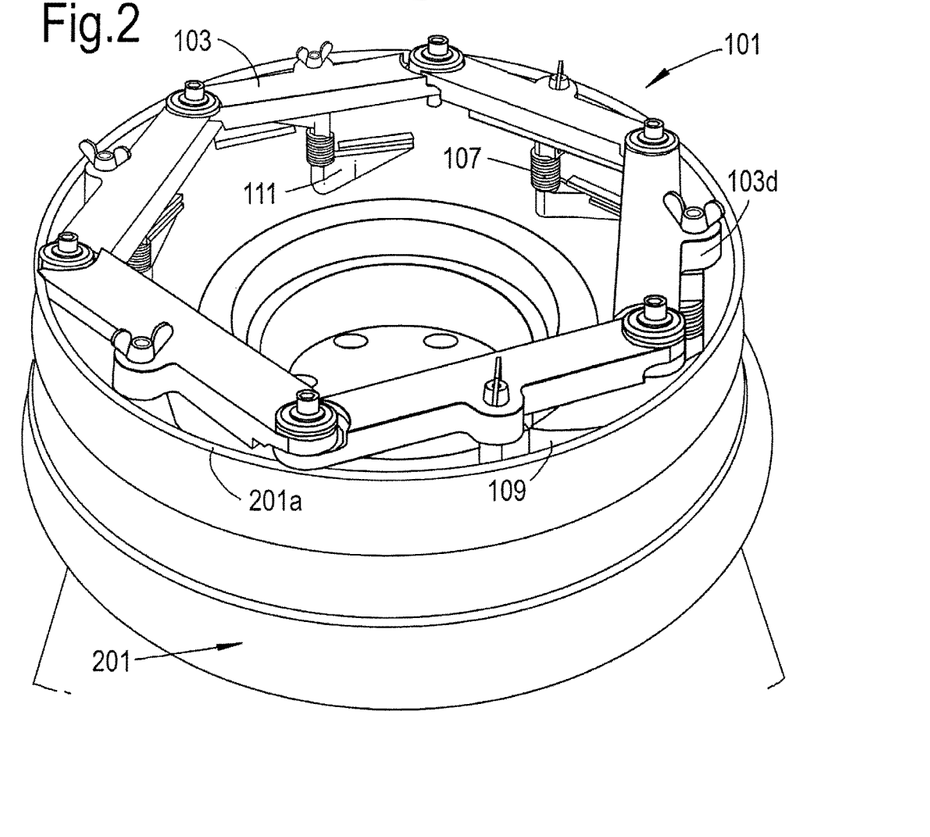
FIG. 2 shows a fixture of the type shown in FIG. 1, in use with a thin-walled component.

Once the fixture 101 has been lowered into the desired position, as depicted in FIG. 2, the upper and lower swing arms 109, 111 are released. The release of energy stored in the spring 107 causes the upper and lower legs 107a, 107b of the spring 107 to move and apply a torque to the upper and lower swing arms 109, 111, thereby turning the upper and lower swing arms 109, 111 about the mandrel 105 and driving the upper and lower paddle portions 109a, 111a toward the internal surface of the wall 201a.

The upper and lower swing arms 109, 111 continue to swivel around the mandrel 105 until they are brought to rest as the upper and lower face parts 109b, 111b are pushed into contact with the wall 201a. In this condition, the spring 107 remains partially deflected (from its original 270 degree state) and so continues to apply a torque to the upper and lower swing arms 109b, 111b, which torque causes the upper and lower face parts 109b, 111b to press on the surface of the wall 201a. In this embodiment, the resilient elements of the upper and lower face parts 109a, 111b conform to the contour of the curved wall 201a so as to maximise the area of contact there with. In this at-rest condition, the pressure applied, by the upper and lower face parts 109b, 111b to the surface of the wall 201a, is substantially constant over time. Furthermore, the said applied pressure is countered by a reaction force exerted on the upper and lower face parts 109b, 111b by the thin-walled casing 201, which reaction force is transmitted through the elements of the fixture 101 and taken up (resisted) by the connected links 103.

The pressing forces, which are applied to the wall 201a of the thin-walled casing 201 by the upper and lower face parts 109b, 111b, under the twisting action of the springs 107, act to retain the fixture 101 in position relative to the thin-walled casing 201 and to provide stiffness to the thin-walled casing 201 as the manufacturing operations (e.g. machining) are carried out. This increase in stiffness reduces displacement/vibration of the thin-walled casing 201, thereby improving the quality of the finished product and lessening machine tool wear. Furthermore, in this embodiment, vibrational forces are also damped by the resilient elements of the upper and lower face parts 109b, 111b. Alternatively, a resilient sheet, for example a neoprene sheet, can be wrapped inside the thin-walled casing 201 prior to insertion of the fixture 101. In this case, the upper and lower face parts 109b, 111b press the sheet against the wall 201 to provide damping to minimise the vibrational forces.

Once the manufacturing operations have been completed, the fixture 101 may be easily removed from the thin-walled component 201 by once more rotating inwardly the upper and lower swing arms 109, 111, for example by hand, against the bias of the spring 107, in order to move the upper and lower swing arms 109, 111 clear of the wall 201a, so that the fixture 101 may be lifted up and away from the thin-walled casing 201. Alternatively, if more convenient, the fixture 101 may be disassembled in-situ, by disconnection of the links 103, and then removed from the thin-walled casing 201 in sections.

Furthermore, since the arrangement of the springs 107 and upper and lower swing arms 109, 111 provides that the pressure applied by the upper and lower face parts 109b, 111b is reliably repeatable, the fixture 101 may conveniently be subsequently refitted to the thin-walled casing 201 so that manufacturing operations may be continued.

Dynamic response tests were conducted on a thin-walled casing, having wall thickness of 2.5 mm, wall height of 95 mm, and wall diameter of 365 mm, using an impact hammer (tap testing). The tests were performed both with and without (a specific and non-limiting example of) a fixture of the type described herein above.

Figure 3:
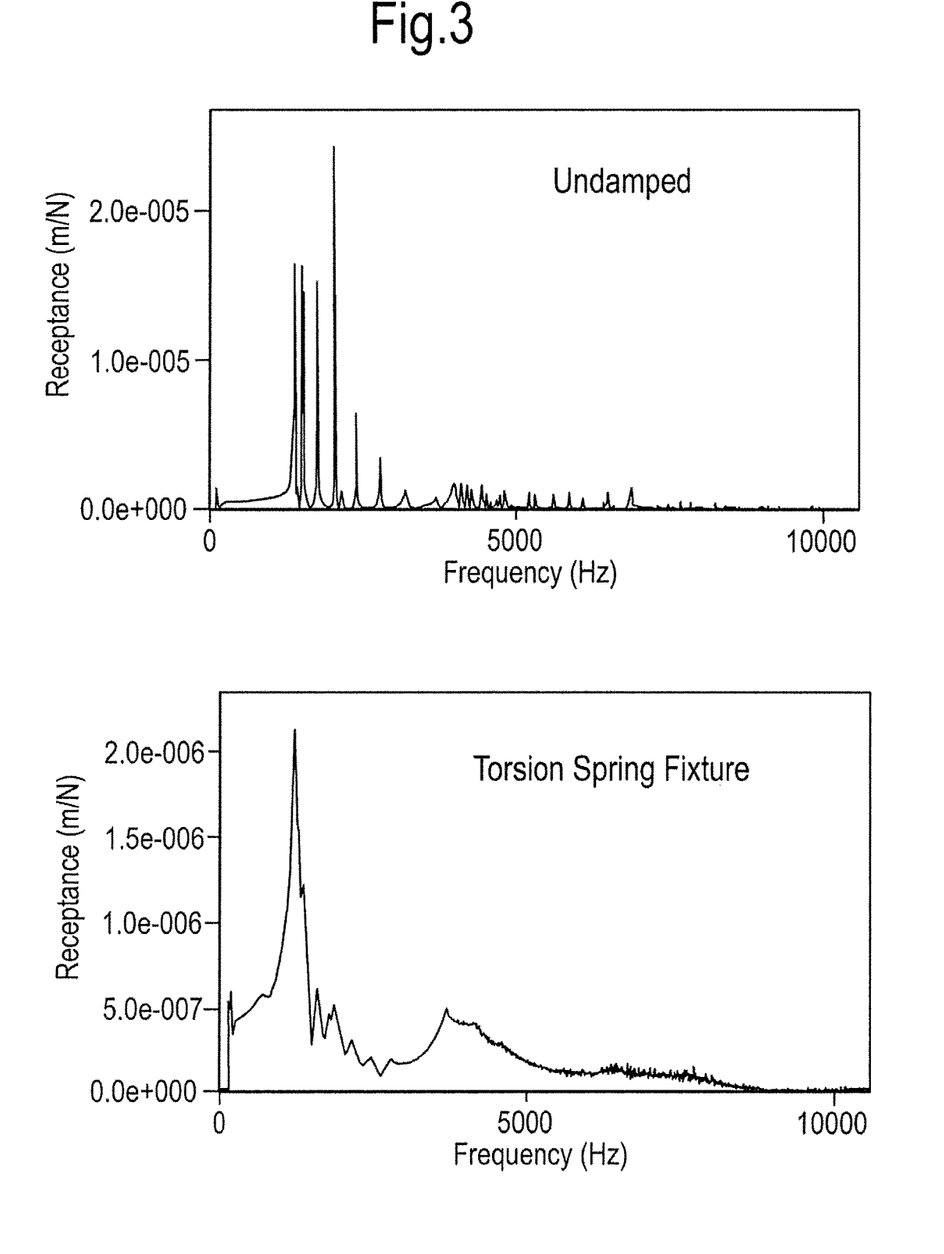
FIGS. 3 and 4 illustrate results of tests carried out on a fixture of the type shown in FIG. 1.
Figure 4:
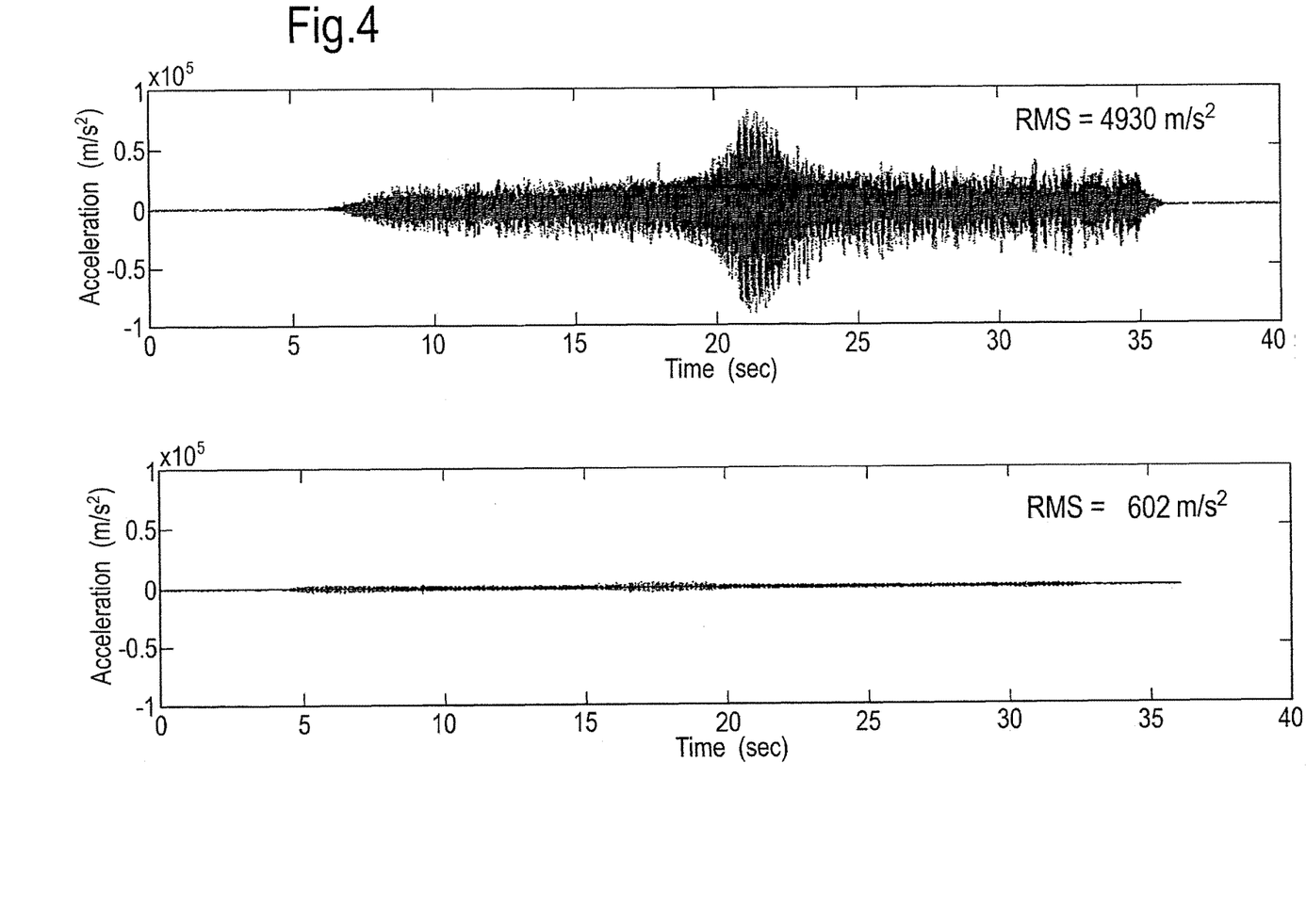

As seen in FIG. 3, there was a reduction in vibration amplitude at the point of impact, from 22 microns to 2 microns, i.e. an improvement of about 10 times. Also, an increase in damping can be noticed by wider peaks in the response acquired on the thin-walled casing with the fixture installed. Machining tests were also carried out, with and without the fixture on the thin-walled casing. As shown in FIG. 4, for a sector angle of 22.5 degrees on the thin-walled casing, the root mean square content of the acceleration signal showed a significant reduction of about 8 times.

The magnitude of the torque exerted on the upper and lower swing arms 109, 111, and therefore the pressure exerted on the wall 201a of the thin-walled casing 201 by the upper and lower face parts 109b, 111b, is determined largely by the characteristics of the biasing element (spring 107). For example, the required level of torque may be obtained by appropriate selection of the material, number of coils, coil diameter, and wire diameter, of the spring 107. Furthermore, the total force applied to the thin-walled casing 201 by the fixture 101 may be made larger (or smaller) by increasing (or reducing) the number of springs 107. Also, while the spring 107 of the embodiment described herein above has a free angle of 270 degrees, it will be understood that any value of spring free angle may be selected which allows the spring to exert sufficient torque on the swing arms 109, 111.

The arrangement of the springs 107 and swing arms 109, 111 means that the fixture 101 is self-actuating, having no need for a motor or other external driving mechanism. The fixture 101 is therefore relatively lightweight and energy-efficient.

The fixture 101 is also able to conform generally to the geometry of the thin-walled casing 201 and can accommodate any angular variations in the surface of the wall 201a. Furthermore, the size of the upper and lower face parts 109b, 111b may be selected to provide any desired surface contact area with the thin-walled casing 201.

The fixture 101 is compact and therefore useful for manufacturing operations where space or access is limited. Also, the fixture may be configured so as not to block off the path of a machine tool. In addition, the fixture 101 is portable because it is easily and quickly disassembled, stored, transported, and reassembled.

Furthermore, the fixture comprises a limited number of low-maintenance, non-complex mechanical parts which are inexpensive to manufacture and require little or no maintenance.

It will be understood that the links of the fixture, and their arrangement, may take various shapes and forms, so long as, when they are connected together, they provide a structure which is sufficiently stiff and rigid substantially to prevent distortion of the fixture, and to keep the fixture in place, under the loads which are exerted on the fixture by the thin-walled component. While the required rigidity may be best achieved by connecting the ends of the links together in a closed polygon, it will be understood that sufficient stiffness may be attained by connecting the links in an open shape. Also, while the connected links of the above-described exemplary embodiment comprise splined portions for locking the links together, it will be understood that other embodiments may comprise alternative locking means for the purpose of preventing relative rotational movement between the connected links, as will be apparent to the skilled reader. One example of an alternative locking means is a hexagonal socket and spigot joint.

Furthermore, the number of connected links can be changed in order to alter the geometry of the fixture. For example, regarding the embodiment described herein above, two more links may be added to provide a fixture having an octagonal shape. Alternatively, one or more links may be added which have a different length to the original links, in order to provide a fixture having an irregular shape, which might better fit a particular thin-walled component which is also of irregular shape. Alternatively, one or more of the links could be removed, and the ends of the remaining links closed, to form, for example, a generally pentagonal, rectangular or triangular, shape. Thus it will be seen that the fixture may be conveniently reconfigured to suit thin-walled components having different sizes and/or shapes. This modularity offers considerable flexibility and reduces set-up time and tooling costs.

In an embodiment, the splined portions of the connecting links are omitted. In this embodiment, the bolts may restrict relative vertical displacement of the connected links (i.e. movement along the axes of the bolts), while allowing the links freedom to rotate relative to one another (i.e. about the axes of the respective bolts). Alternatively, the bolts may be tightened so as to exert a clamping force which is sufficient also to restrict relative rotational movement of the connected links. Thus, the assembly of connected links may be made relatively more, or less, rigid as required by the particular application.

In an embodiment, the connected links are staggered, angled, or otherwise arranged such that the links do not generally lie in a single, flat plane. Such an embodiment can be used for differently shaped casings, such as bell-shaped or convergent-divergent shaped casings.

In an embodiment, the lugs and bolts are omitted and the mandrels originate and extend from the intersecting portions of the connected links. In this embodiment, the mandrels also secure the links together and may include splined portions for locking the links to restrict relative rotation of the links. Such an embodiment may enable the same fixture to be used over a wider range of casing diameters with a constant torque from the springs, compared to an embodiment wherein the mandrels extend from central portions of the connecting links, in which the chordal gap from the mid-point of connecting link-to-casing varies with the casing diameter.

In an embodiment, only one swing arm and one spring (or other biasing element) is provided on each mandrel.

In an embodiment, two or more mandrels, each supporting a spring and upper and/or lower spring arms, are provided per connected link.

In an embodiment, more than two swing arms and more than two springs (or other biasing elements) are provided on each mandrel.

The surfaces of the face parts, for contacting/pushing on the thin-walled component, may take different forms, depending on requirements regarding fixing and damping. In an embodiment, the upper and/or lower face parts are curved, for example convex or concave. In an embodiment, the upper and/or lower face parts comprise vibration-absorbing resilient pads which may have a curved (e.g. convex or concave), or flat, surface. In another embodiment, the upper and/or lower face parts are solid or rigid and may have a curved (e.g. convex or concave), flat, or angular (e.g. sharp-edged), surface.

In an embodiment, the swing arms comprise a plurality of jointed segments which may enable close conformation between the face parts and the thin-walled component. Alternatively, the swing arms may be constructed of shape memory alloy which takes the shape of the casing.

In an embodiment, the upper and/or lower face parts, and/or the upper and/or lower swing arms, are arranged to have a relatively low thermal conductance in order to prevent significant heat transfer between the thin-walled component and the fixture, in particular a level of heat which may cause distortion of the fixture.

In an embodiment, the legs of the spring are permanently joined to the swing arms.

In an embodiment, the fixture includes retaining means arranged to hold (prime) the spring in the deflected condition prior to releasing the upper and lower swing arms. In an embodiment, the retaining means comprise a hook and a pin, the hook holding the upper and lower swing arms against the spring force and the pin being removable from the hook to release the upper and lower swing arms.

In an embodiment, the spring is replaced by an alternative biasing element, for example a rubber element or some other resilient element, which can exert a force to move the swing arm(s).

In an embodiment, the swing arms and the springs (or other biasing elements) are of unitary construction. That is, a single element provides both the biasing function and the pressure function.

In an embodiment, an elastomeric material, for example neoprene, is attached to the upper and lower face parts 109b, 111b by an adhesive.

In an embodiment, the mandrel is omitted. Instead, a piston arrangement is attached to the connecting links and is operable to engage the thin-walled casing by means of leaf springs, flexural metallic sheets, gas springs, helical compression springs, or the like.

In an embodiment, the links are constructed from a metallic or metallic-alloy material, for example comprising aluminium, steel, or titanium.

Figure 5:
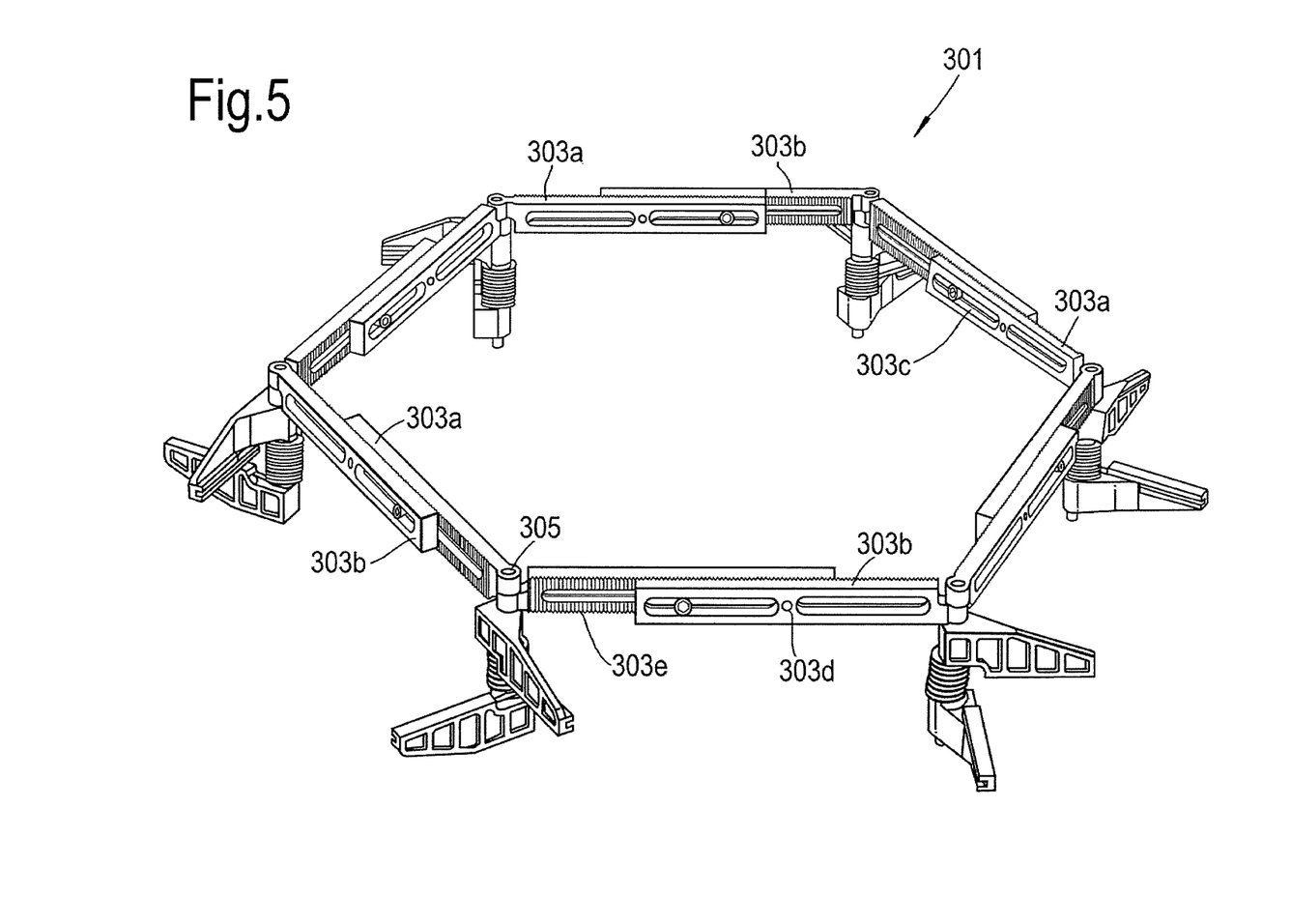
FIGS. 5 to 7 are schematic illustrations of alternative embodiments of the fixture.

The fixture shown in FIG. 5 is generally similar to the fixture 101 described herein above, except that, in this embodiment, the connected links are adjustable, so that the size and/or shape of the fixture 301 may be changed, as follows.

In this embodiment, the fixture 301 comprises six inner links 303a and six outer links 303b, arranged in respective, opposing pairs to form a regular hexagon. For convenience, the means of adjustment will be presented in terms of only one pair of respective, opposing inner and outer links 303a, 303b. However, it will be understood that the principle of adjustment is the same for each of the six pairs.

Each of a pair of inner and outer links 303a, 303b comprises guide channels 303c which extend substantially the length of the links 303a, 303b. A fastener 303d is disposed transversely through the guide channels 303c. Each of an outer face of the inner link 303a, and an opposing inner face of the outer link 303b, comprises a row of teeth 303e. With the fastener 303d in a loosened condition, the respective rows of teeth 303e are free to move (slide) over one another as the inner and/or the outer links 303a, 303b are moved in a longitudinal direction, either to increase or decrease the length of the side of the fixture 301. When the fastener 303d is tightened, the respective rows of teeth 303e engage with one another to prevent further relative longitudinal (sliding) movement between the inner and outer links 303a, 303b. In this way, the connected links 303a, 303b of the fixture 301 may be conveniently adjusted to fit a variety of sizes and shapes of thin-walled components.

It will be understood that, while the rows of teeth 303e provide discrete adjustment for relative positions of the inner and outer links 303a, 303b, in other embodiments the adjustment may be made essentially continuous or infinite.

Figure 6:
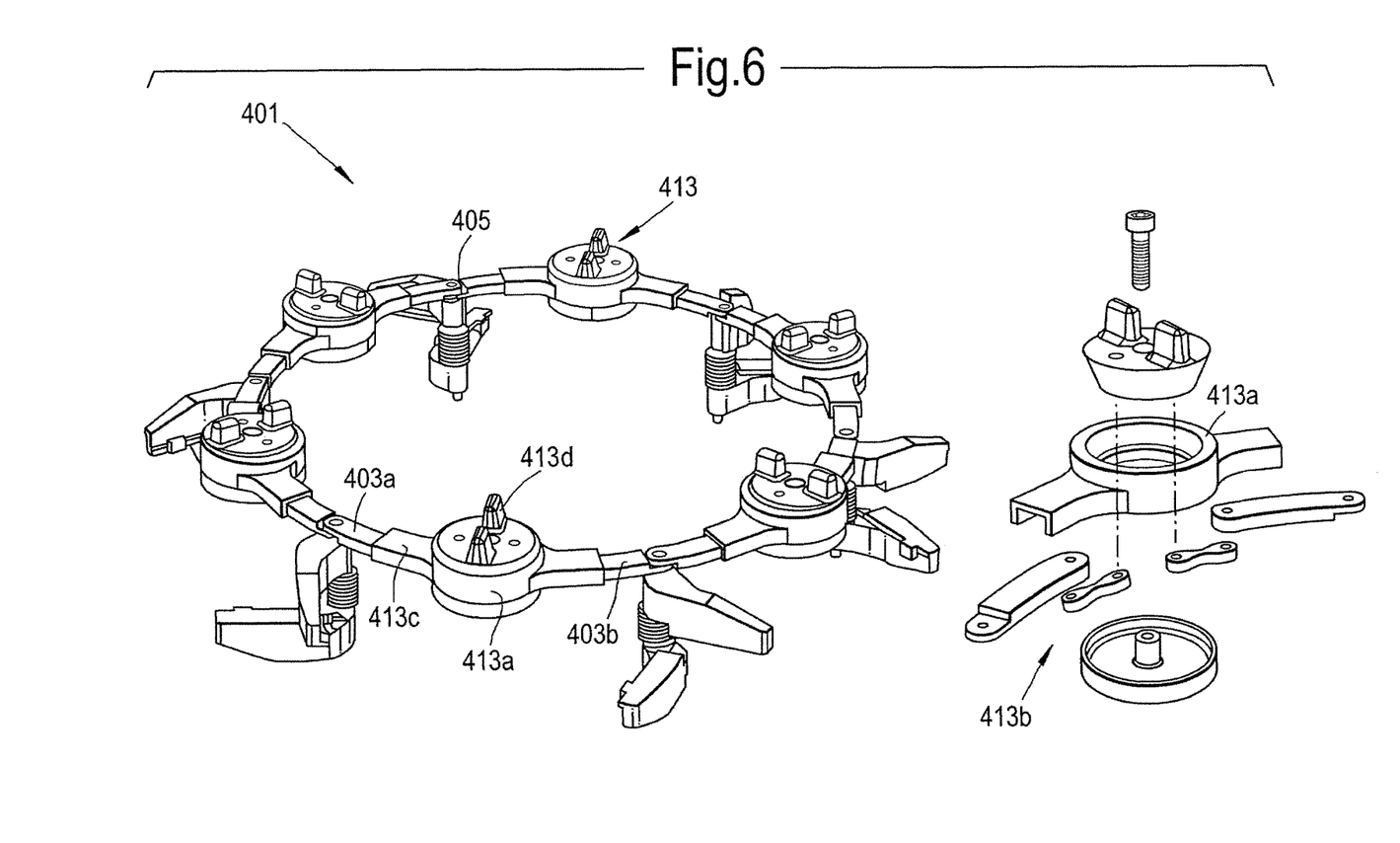

FIG. 6 shows another embodiment wherein connected links of a fixture are adjustable, so that the size and/or shape of the fixture may be changed. In this embodiment, a fixture 401 comprises six arcuate links 403 which are arranged such that the fixture 401 is generally circular in shape. For convenience, the means of adjustment will be presented in terms of only one of the links 403. However, it will be understood that the principle of adjustment is the same for each of the six links 403.

In this embodiment, a link 403 comprises a pair of half-links 403a, 403b and an adjuster 413 disposed therebetween. The adjuster 413 comprises a housing 413a in which a cam mechanism 413b is disposed. The housing 413a comprises a pair of outwardly-projecting arcuate channel portions 413c and a handle 413d. Each of the half-links 403a, 403b extends through one of the channel portions 413c and is arranged in sliding relationship there with. One end of the respective half-link 403a is connected to the cam mechanism 413b, and the other end is connected to an adjacent link 403.

Turning the handle 413d in a first direction causes the cam mechanism 413b to displace the half-links 403a, 403b inwardly through the channel portions 413c, thereby shortening the link 403. Conversely, turning the handle 413d in a second, opposite direction causes the cam mechanism 413b to displace the half-links 403a, 403b outwardly through the channel portions 413c, thereby lengthening the link 403. In this way, the connected links 403 of the fixture 401 may be conveniently adjusted to fit a variety of sizes and shapes of thin-walled components.

Another notable difference, between the fixtures 301; 401 shown in FIGS. 5 and 6, and the fixture 101 shown in FIG. 1, is that the mandrels 305; 405 originate and extend from intersecting portions of the connected inner and outer links 303a, 303b; 403. In an alternative arrangement, the mandrels 305; 405 extend from mid-portions of the inner and outer links 303a; 303b, 403 in the manner depicted in FIG. 1.

While the fixtures described herein above have been presented as being suitable to be secured to the inside of a thin-walled component, it should be understood that they are also suited to external application. The operation of a fixture, when installed to the outside of a thin-walled component, is essentially the same as has already been described, except that, of course, the swing arm(s) will be urged generally inwardly, rather than outwardly, by the respective biasing element(s), in order to exert pressure on (i.e. clamp) an external surface of the thin-walled component.

Figure 7:
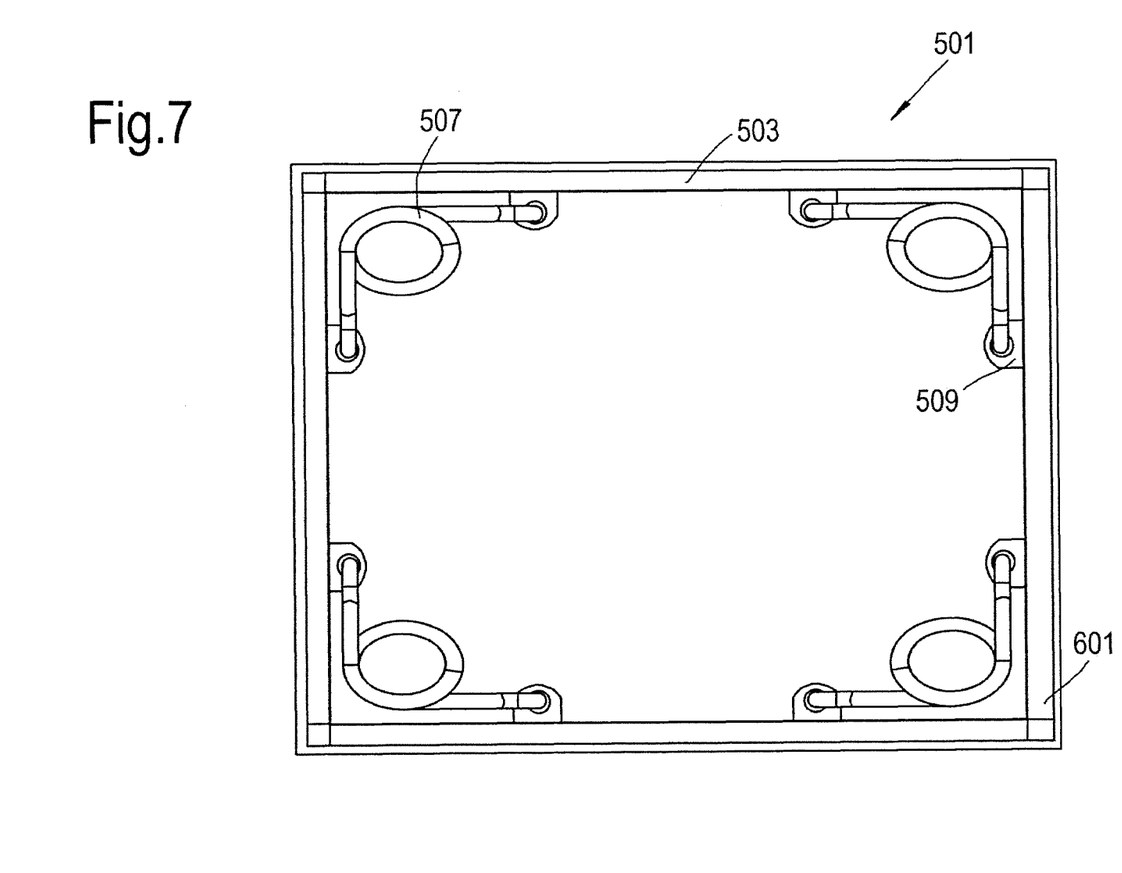

Furthermore, the fixture is also suited to use with non-circular (e.g. prismatic) thin-walled components. For example, FIG. 7 shows a fixture 501 in use with a thin-walled casing 601 having a rectangular section. (For the sake of clarity the connected links and other features of the fixture 501 are omitted from the figure). In this embodiment, the fixture includes springs 507 which are arranged to urge respective swing arms (not shown) toward the corners of the thin-walled casing 601, in order to provide stiffness to the thin-walled casing 601 in the manner described herein above. In this embodiment, the springs 507 have a free angle of 180 degrees and are twisted to a 90 degree angle to exert torque on the swing arms. In another embodiment, additional springs (for example having a free angle of 270 degrees) and respective swing arms are provided along the sides of the thin-walled casing 601 in order to increase the total force applied to the thin-walled casing 601.

Thus it will be understood that the fixture is widely suitable for use in the manufacture, inspection, maintenance and repair of thin-walled components, including generally circular or prismatic thin-walled structures.

It will also be understood that the invention has been described in relation to its preferred embodiments and may be modified in many different ways without departing from the scope of the invention as defined by the accompanying claims.

The invention claimed is:

1. A fixture for stiffening a thin-walled component, the fixture comprising:
    linking elements which support respective biasing parts and pressure parts,
    the biasing parts are arranged to urge the pressure parts to press on a thin-walled component,
    the biasing parts include torsion elements,
    the linking elements include elongated segments that are adjustable relative to each other along a slot, and
    the linking elements are connected to one another to resist a reaction force exerted on the pressure parts by the thin-walled component.

2. The fixture according to claim 1, wherein the linking elements are connected to one another so as to restrict relative rotational movement between the linking elements.

3. The fixture according to claim 1, wherein the linking elements are connected to one another so as to allow relative rotational movement between the linking elements.

4. The fixture according to claim 1, wherein the linking elements are each generally straight and are connected together at respective ends of the linking elements to form a polygon.

5. The fixture according to claim 4, wherein the polygon is either a regular polygon or an irregular polygon, the regular polygon having a generally triangular, rectangular, pentagonal, hexagonal, septangonal, octagonal, or circular shape.

6. The fixture according to claim 1, wherein the linking elements are generally arcuate and are connected together at respective ends of the linking elements to form a generally circular shape.

7. The fixture according to claim 3, wherein the linking elements are adjustable in order to change at least one of the size and shape of the polygon or circle.

8. The fixture according to claim 1, wherein the respective biasing parts and pressure parts are either discrete elements or are of unitary construction.

9. The fixture according to claim 1, wherein the pressure parts are either generally curved or generally flat.

10. The fixture according to claim 1, wherein the pressure parts comprise either resilient elements or rigid elements.

11. The fixture according to claim 1 wherein the torsion elements include torsion springs.

12. The fixture according to claim 1, wherein the respective biasing parts and pressure parts are disposed on axles which extend substantially perpendicularly from the linking elements, and the pressure parts are arranged to rotate about the axles.

13. The fixture according to claim 12, wherein two or more pressure parts are disposed on each axle.

14. The fixture according to claim 12, wherein two or more biasing parts are disposed on each axle.

15. The fixture according to claim 12, wherein each of the axles either extends from a generally mid-region of one of the linking elements or extends from intersecting or connected portions of the linking elements.

16. A combination of a fixture and a thin-walled component of a gas turbine engine, the fixture being secured to the thin-walled component, the fixture comprising:
    linking elements which support respective biasing parts and pressure parts,
    the biasing parts urging the pressure parts to press on the thin-walled component in order to stiffen the thin-walled component,
    the biasing parts including torsion elements, and
    the linking elements being rigidly connected to one another to resist a reaction force exerted on the pressure parts by the thin-walled component.

17. The combination of a fixture and a thin-walled component according to claim 16, wherein the fixture is either secured to the inside of the thin-walled component or secured to the outside of the thin-walled component.

18. The combination of a fixture and a thin-walled component according to claim 16, wherein the thin-walled component is a front bearing housing of the gas turbine engine.

19. A fixture for stiffening a thin-walled component, the fixture comprising:
  linking elements which support respective biasing parts and pressure parts,
    the biasing parts are arranged to urge the pressure parts to press on a thin-walled component,
    the biasing parts include torsion springs, the torsion springs having an upper leg and a lower leg, the upper leg being removably secured to an upper swing arm, and the lower leg being removably secured to a lower swing arm and
    the linking elements are connected to one another to resist a reaction force exerted on the pressure parts by the thin-walled component.

* * * * *